United States Patent
Amano et al.

(10) Patent No.: US 10,396,316 B2
(45) Date of Patent: Aug. 27, 2019

(54) CELL PACKAGING MATERIAL AND CELL

(71) Applicant: DAI NIPPON PRINTING CO., LTD., Tokyo (JP)

(72) Inventors: Makoto Amano, Tokyo (JP); Rikiya Yamashita, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 0 days.

(21) Appl. No.: 15/557,777

(22) PCT Filed: Mar. 25, 2016

(86) PCT No.: PCT/JP2016/059742
§ 371 (c)(1),
(2) Date: Sep. 12, 2017

(87) PCT Pub. No.: WO2016/153059
PCT Pub. Date: Sep. 29, 2016

(65) Prior Publication Data
US 2018/0076422 A1   Mar. 15, 2018

(30) Foreign Application Priority Data

Mar. 25, 2015 (JP) .................. 2015-063402
Mar. 25, 2015 (JP) .................. 2015-063403

(51) Int. Cl.
*H01M 2/02* (2006.01)
*B32B 15/08* (2006.01)
(Continued)

(52) U.S. Cl.
CPC .......... *H01M 2/0287* (2013.01); *B29C 55/12* (2013.01); *B32B 7/12* (2013.01); *B32B 15/08* (2013.01); *H01M 2/0275* (2013.01); *H01M 2/0277* (2013.01); *H01M 2/0292* (2013.01); *B29C 55/005* (2013.01); *B29K 2077/00* (2013.01); *B29L 2031/7146* (2013.01); *B32B 2255/06* (2013.01); *B32B 2255/10* (2013.01);
(Continued)

(58) Field of Classification Search
None
See application file for complete search history.

(56) References Cited

U.S. PATENT DOCUMENTS

| 2008/0286635 | A1  | 11/2008 | Seino et al. |
| 2013/0209868 | A1  | 8/2013  | Suzuta et al. |
| 2015/0372263 | A1* | 12/2015 | Douke ............... H01M 2/0275 429/176 |

FOREIGN PATENT DOCUMENTS

| JP | 2007-069569 A | 3/2007 |
| JP | 2008-287971 A | 11/2008 |

(Continued)

OTHER PUBLICATIONS

Jun. 14, 2016 International Search Report issued in International Patent Application No. PCT/JP2016/059742.

*Primary Examiner* — Wyatt P McConnell
(74) *Attorney, Agent, or Firm* — Oliff PLC

(57) ABSTRACT

A cell packaging material in which the substrate layer surface has excellent ink printing characteristics. Cell packaging material including a layered article provided with at least a substrate layer, a metal layer, and a heast-fusible layer in the stated order, the substrate layer being formed from a polyamide resin containing an ethylene-bis-stearic acid amide and an ethylene-bis-oleic acid amide.

10 Claims, 1 Drawing Sheet

(51) Int. Cl.
*B29C 55/12* (2006.01)
*B32B 7/12* (2006.01)
*C08J 5/18* (2006.01)
*C08K 5/20* (2006.01)
*C08L 77/00* (2006.01)
*B29L 31/00* (2006.01)
*B29K 77/00* (2006.01)
*B29C 55/00* (2006.01)

(52) U.S. Cl.
CPC . *C08J 5/18* (2013.01); *C08K 5/20* (2013.01); *C08L 77/00* (2013.01)

(56) References Cited

FOREIGN PATENT DOCUMENTS

| | | |
|---|---|---|
| JP | 2008-297416 A | 12/2008 |
| JP | 2012-124068 A | 6/2012 |
| JP | 2014-054797 A | 3/2014 |
| JP | 2014-199761 A | 10/2014 |
| JP | 2015-065159 A | 4/2015 |
| JP | 2016-072211 A | 5/2016 |
| WO | 2012/050182 A1 | 4/2012 |
| WO | WO-2014123164 A1 * | 8/2014 ......... H01M 2/0275 |

* cited by examiner

CELL PACKAGING MATERIAL AND CELL

TECHNICAL FIELD

The present invention relates to a battery packaging material and a battery.

BACKGROUND ART

Various types of batteries have been developed heretofore, and in every battery, a packaging material is an essential member for sealing battery elements such as an electrode and an electrolyte. Metallic packaging materials have been often used heretofore as battery packages, but in recent years, batteries have been required to be diversified in shape, and desired to be thinner and lighter as performance of, for example, electric cars, hybrid electric cars, personal computers, cameras and mobile phones has been enhanced. However, metallic battery packaging materials that have often been heretofore used have the disadvantage that it is difficult to keep up with diversification in shape, and there is a limit on weight reduction.

Thus, a film-shaped laminate with a base material layer, an adhesive layer, a metal layer and a heat-sealable resin layer laminated in this order has been proposed as a battery packaging material which is easily processed into diversified shapes and is capable of achieving thickness reduction and weight reduction (see, for example, Patent Document 1). The film-shaped battery packaging material is formed in such a manner that a battery element can be sealed by heat-welding the peripheral edge by heat sealing with the heat-sealable resin layers facing each other.

For various packaging materials formed from a laminate as described above, a method for performing printing on a packaging material in the following manner is generally employed: printing is performed on a surface of a base material layer with an ink to form a bar code, a pattern or letters or the like thereon, and an adhesive and a metal foil are laminated on the printed surface of the base material layer (commonly referred to as reverse printing). However, when such a printed surface exists between a base material layer and a metal layer, adhesion between the base material layer and the metal layer is reduced, so that delamination between layers easily occurs. Particularly, for batteries to which battery packaging materials are applied, high safety is required, and therefore a method for performing printing by reverse printing as described above is avoided in battery packaging materials. Therefore, a method has been commonly employed in which a seal provided with printed characters is attached to a surface of a base material layer when printed characters such as a bar code are formed on a battery packaging material.

However, when a seal provided with printed characters is attached to a surface of a base material layer, the thickness and the weight of the battery packaging material increase. Thus, in view of the tendency of further reducing the thickness and the weight of a battery packaging material in recent years, studies have been conducted on a method for performing printing on a battery packaging material by directly printing a surface of a base material layer of a battery packaging material with an ink.

As a method for directly printing a surface of a base material layer of a battery packaging material with an ink, pad printing (also referred to as tampo-printing) is known. The pad printing is the following printing method. First, an ink is fed into a recess portion of a flat plate on which a pattern to be printed is provided by etching. Next, a silicon pad is pressed to the flat plate from above the recess portion to transfer the ink to the silicon pad. Next, the ink transferred to a surface of the silicon pad is transferred to a printed object to apply the ink to the printed object. The pad printing has such an advantage that since an ink is transferred to a printed object using an elastic silicon pad, printing is easily performed on a surface of a battery packaging material after molding, so that printing on a battery is possible after a battery element is sealed with the battery packaging material.

For the base material layer of the battery packaging material, a polyamide resin film such as a nylon film is commonly used, and the polyamide resin film generally contains ethylene bis-oleic acid amide as a water repellant. By including a water repellant, wettability of the molten resin to water is adjusted in production of the film, so that moderate irregularities (surface roughness) can be formed on a surface of the raw film, and even after the raw film is stretched, the irregularity shape remains, so that a polyamide resin film having adjusted surface slippage can be obtained.

PRIOR ART DOCUMENT

Patent Document

Patent Document 1: Japanese Patent Laid-open Publication No. 2008-287971

SUMMARY OF THE INVENTION

Problems to be Solved by the Invention

Studies conducted by the present inventors have revealed that when a polyamide resin film containing ethylene bis-oleic acid amide as a water repellant is used in a base material layer, heat is applied in a baking step etc. after a battery element such as an electrolytic solution is encapsulated in a battery packaging material, whereby ethylene bis-oleic acid amide is bled out on a surface of a base material layer, and thus when the surface of the base material layer is printed with an ink by pad printing etc., an ink is repelled at the surface of the base material layer, and thus the ink is hardly fixed, so that a missing part where the ink is not deposited may exist. It has been revealed that particularly when printing is performed by pad printing, the printability tends to be insufficient.

Under these circumstances, a main object of the present invention is to provide a battery packaging material having an excellent ink printing characteristic on a surface of a base material layer formed of a polyamide resin film. Further, another object of the present invention is to provide a method for producing the battery packaging material, and a battery including the battery packaging material.

Means for Solving the Problems

The present inventors have extensively conducted studies for achieving the above-mentioned object. Resultantly, the present inventors have found that when in a battery packaging material including a laminate including at least a base material layer, a metal layer and a heat-sealable resin layer in this order, the base material layer is formed of a polyamide resin containing ethylene bis-stearic acid amide, the ink printing characteristic on the surface of the base material layer can be effectively improved. A first aspect of the present invention has been completed by further conducting studies based on the above-mentioned findings.

The present inventors have further extensively conducted studies for achieving the above-mentioned object. Resultantly, the present inventors have found that when in a battery packaging material including a laminate including at least a base material layer, a metal layer and a heat-sealable resin layer in this order, the base material layer is formed of a polyamide resin containing ethylene bis-oleic acid amide, and the content of ethylene bis-oleic acid amide is set to 400 ppm or less, the ink printing characteristic on the surface of the base material layer can be effectively improved. A second aspect of the present invention has been completed by further conducting studies based on the above-mentioned findings.

That is, the present invention provides an invention of the aspects described below.

Item 1. A battery packaging material including a laminate including at least a base material layer, a metal layer and a heat-sealable resin layer in this order, wherein
the base material layer is formed of a polyamide resin containing ethylene bis-stearic acid amide.

Item 2. The battery packaging material according to item 1, wherein the amount of ethylene bis-stearic acid amide existing per area of 210 mm×297 mm of a surface of the base material layer after the battery packaging material is left standing in a thermostatic bath at 100° C. for 24 hours is 30 μg or less.

Item 3. A battery packaging material including a laminate including at least a base material layer, a metal layer and a sealant layer in this order, wherein
the base material layer is formed of a polyamide resin containing ethylene bis-oleic acid amide, and
the content of ethylene bis-oleic acid amide in the base material layer is 400 ppm or less.

Item 4. The battery packaging material according to item 3, wherein the amount of ethylene bis-oleic acid amide existing per area of 210 mm×297 mm of a surface of the base material layer after the battery packaging material is left standing in a thermostatic bath at 100° C. for 24 hours is 380 μg or less.

Item 5. The battery packaging material according to any one of items 1 to 4, wherein at least a part of the surface of the base material layer is an ink receiving surface.

Item 6. The battery packaging material according to any one of items 1 to 4, wherein a printing layer formed of an ink is provided on at least a part of the surface of the base material layer.

Item 7. The battery packaging material according to any one of items 1 to 6, wherein the surface of the base material layer has a wet tension of 32 mN/m or more.

Item 8. The battery packaging material according to any one of items 1 to 7, wherein the polyamide resin is biaxially stretched nylon.

Item 9. The battery packaging material according to any one of items 1 to 8, wherein an adhesive layer is provided between the base material layer and the metal layer.

Item 10. The battery packaging material according to any one of items 1 to 9, wherein an adhesive layer is provided between the metal layer and the heat-sealable resin layer.

Item 11. The battery packaging material according to any one of items 1 to 10, wherein the metal layer is an aluminum foil or a stainless steel foil.

Item 12. A battery, wherein a battery element including at least a positive electrode, a negative electrode and an electrolyte is stored in a package formed of the battery packaging material according to any one of items 1 to 11.

Advantages of the Invention

According to the present invention, there can be provided a battery packaging material having an excellent ink printing characteristic on a surface of a base material layer. Further, according to the present invention, there can be provided a battery produced using the battery packaging material.

EMBODIMENTS OF THE INVENTION

A battery packaging material according to a first aspect of the present invention includes a laminate including at least a base material layer, a metal layer and a heat-sealable resin layer in this order, wherein the base material layer is formed of a polyamide resin containing ethylene bis-stearic acid amide. The battery packaging material according to the first aspect of the present invention, a method for producing the battery packaging material, and a battery including the battery packaging material will be described in detail below.

A battery packaging material according to a second aspect of the present invention includes a laminate including at least a base material layer, a metal layer and a heat-sealable resin layer in this order, wherein the base material layer is formed of a polyamide resin containing ethylene bis-oleic acid amide, and the content of ethylene bis-oleic acid amide in the base material layer is set to 400 ppm or less. The battery packaging material according to the second aspect of the present invention, a method for producing the battery packaging material, and a battery including the battery packaging material will be described in detail below.

There is no difference in configuration between the first invention and the second invention except for the configuration of the base material layer 1.

1. Laminated Structure of Battery Packaging Material

Figure 1:
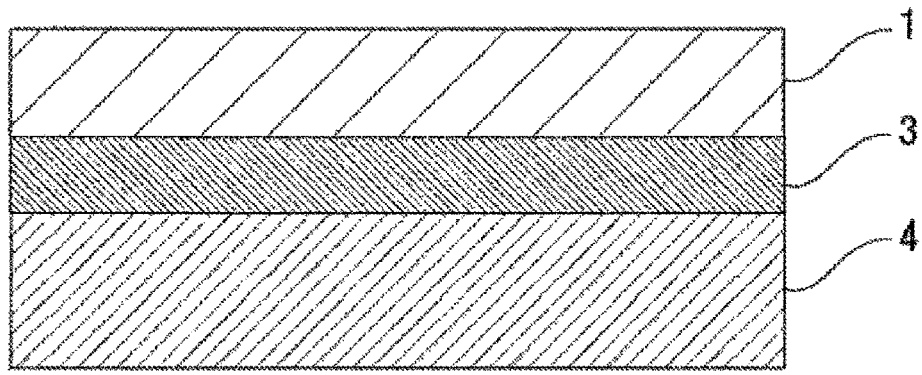
FIG. 1 is a drawing showing one example of a cross-sectional structure of a battery packaging material according to the present invention.

The battery packaging material according to the present invention includes a laminate including at least a base material layer 1, a metal layer 3 and a heat-sealable resin layer 4 in this order as shown in FIG. 1. In the battery packaging material according to the present invention, the base material layer 1 is an outermost layer, and the heat-sealable resin layer 4 is an innermost layer. That is, at the time of assembling a battery, the heat-sealable resin layer 4 situated on the periphery of a battery element is heat-welded with itself to hermetically seal the battery element, so that the battery element is encapsulated.

Figure 2:
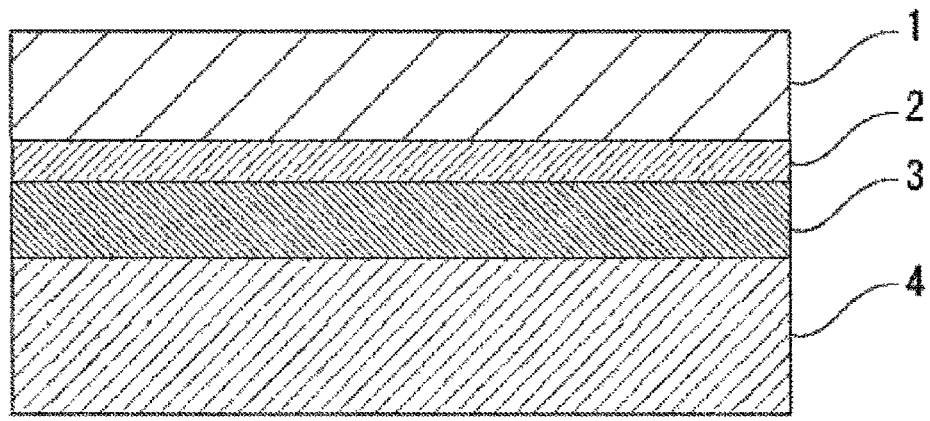
FIG. 2 is a drawing showing one example of a cross-sectional structure of a battery packaging material according to the present invention.
Figure 3:
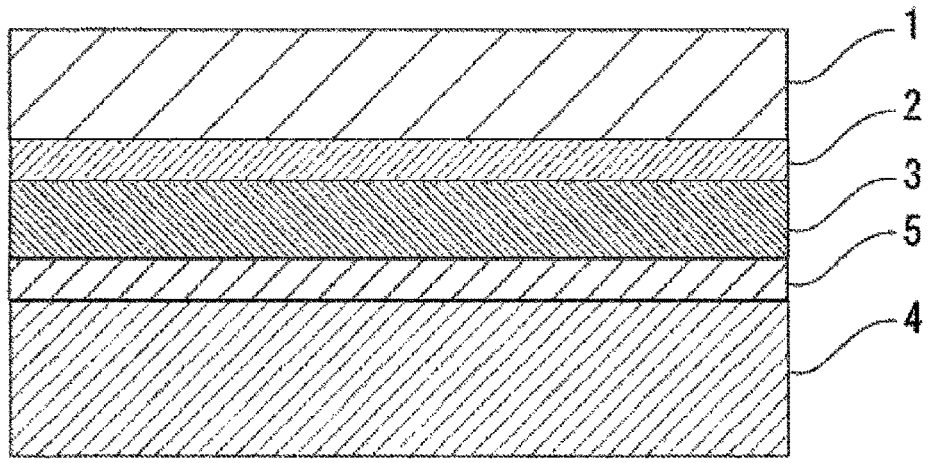
FIG. 3 is a drawing showing one example of a cross-sectional structure of a battery packaging material according to the present invention.

As shown in FIG. 2, the battery packaging material according to the present invention may be provided with an adhesive agent layer 2 between the base material layer 1 and the metal layer 3 as necessary in order to improve adhesion of these layers. As shown in FIG. 3, an adhesive layer 5 may be provided between the metal layer 3 and the heat-sealable resin layer 4 as necessary in order to improve adhesiveness of these layers.

2. Composition of Each Layer Forming Battery Packaging Material

[Base Material Layer 1]

In the battery packaging material according to the first aspect of the present invention, the base material layer 1 is a layer situated as an outermost layer. In the first aspect of the present invention, the base material layer 1 is formed of a polyamide resin containing ethylene bis-stearic acid amide.

In the battery packaging material according to the second aspect of the present invention, the base material layer 1 is a layer situated as an outermost layer. For the base material layer 1 in the second aspect of the present invention, the base material layer 1 is formed of a polyamide resin containing ethylene bis-oleic acid amide, and the content of ethylene bis-oleic acid amide in the base material layer 1 is set to 400 ppm or less.

The polyamide resin is preferably nylon. Specific examples of the polyamide resin include aliphatic polyamides such as nylon 6, nylon 66, nylon 610, nylon 12, nylon 46, and copolymers of nylon 6 and nylon 6,6; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamide resins may be used alone, or may be used in combination of two or more thereof.

The base material layer 1 may be formed of a uniaxially or biaxially stretched polyamide resin film, or may be formed of an unstretched polyamide resin film. A stretched polyamide resin film is excellent in stretchability, can prevent occurrence of whitening due to resin breakage in the base material layer 1 during molding, and is thus suitably used as a material for formation of the base material layer 1. Among stretched polyamide resin films, a uniaxially or biaxially stretched polyamide resin film, particularly a biaxially stretched polyamide resin film (particularly a biaxially stretched nylon film) has improved heat resistance through orientation and crystallization, and is therefore suitably used as the base material layer 1.

In the first aspect of the present invention, the polyamide resin contains ethylene bis-stearic acid amide. The ethylene bis-stearic acid amide favorably functions as a water repellant in the polyamide resin that forms the base material layer 1. Specifically, since the polyamide resin contains ethylene bis-stearic acid amide, wettability of the molten resin to water is adjusted in production of the polyamide resin film, so that moderate irregularities (surface roughness) can be formed on a surface of the raw film, and even after the raw film is stretched, the irregularity shape remains, so that a polyamide resin film having adjusted surface slippage can be obtained. The polyamide resin that forms the base material layer 1 may contain ethylene bis-oleic acid amide that has been heretofore commonly used as a water repellant, but for improving printability of the surface of the base material layer, it is preferable that the polyamide resin does not substantially contain ethylene bis-oleic acid amide.

The content of ethylene bis-stearic acid amide in the polyamide resin that forms the base material layer 1 in the first aspect of the present invention is not particularly limited, but it is preferably about 1 ppm or more and 600 ppm or less, more preferably about 50 ppm or more and 500 ppm or less, still more preferably about 100 ppm or more and 400 ppm or less. In the first aspect of the present invention, the content of the ethylene bis-stearic acid amide in the polyamide resin that forms the base material layer 1 is a total amount of ethylene bis-stearic acid amide existing in the polyamide resin and on the surface of the polyamide resin. The content of ethylene bis-stearic acid amide in the polyamide resin that forms the base material layer 1 of the battery packaging material is quantitatively determined by peeling off the base material layer 1 from the battery packaging material, dissolving the base material layer 1 in hexafluoroisopropyl alcohol, then adding dimethyl ethane to cause solvent precipitation, and separating a resin component to prepare an extracting solution of ethylene bis-oleic acid amide, and analyzing the extracting solution by GC-MS.

In the battery packaging material according to the first aspect of the present invention, it is preferable that the amount of ethylene bis-stearic acid amide existing per area of 210 mm×297 mm (A4 size) of a surface of the base material layer after the battery packaging material is left standing in a thermostatic bath at 100° C. for 24 hours is 30 µg or less. The treatment of leaving the battery packaging material standing in a thermostatic bath at 100° C. for 24 hours simulates a baking step during production of a battery cell, and when the amount of ethylene bis-stearic acid amide bled out on the surface of the base material layer 1 by the treatment is 30 µg/A4 size or less, a battery packaging material can be obtained which hardly repels an ink on a surface of the base material layer 1, and thus has further excellent printability. Ethylene bis-stearic acid amide is more hardly bled out by heating as compared to ethylene bis-oleic acid amide, and therefore for example, when the content of ethylene bis-stearic acid amide in the polyamide resin is in a range as described above, the amount of ethylene bis-stearic acid amide bled out on the surface of the base material layer 1 by the baking treatment can be favorably set to 30 µg/A4 size or less. Specifically, the amount of the ethylene bis-stearic acid amide in the battery packaging material is a value measured is a value measured by a method as described in examples below.

In the second aspect of the present invention, the polyamide resin contains ethylene bis-oleic acid amide. The content of ethylene bis-oleic acid amide in the polyamide resin is 400 ppm or less. The ethylene bis-oleic acid amide favorably functions as a water repellant in the polyamide resin that forms the base material layer 1. Specifically, since the polyamide resin contains 400 ppm or less of ethylene bis-oleic acid amide, wettability of the molten resin to water is adjusted in production of the polyamide resin film, so that moderate irregularities (surface roughness) can be formed on a surface of the raw film, and even after the raw film is stretched, the irregularity shape remains, so that a polyamide resin film having adjusted surface slippage can be obtained.

The content of ethylene bis-oleic acid amide in the polyamide resin that forms the base material layer 1 in the second aspect of the present invention is not particularly limited, but it is preferably about 1 ppm or more and 400 ppm or less, more preferably about 50 ppm or more and 350 ppm or less, still more preferably about 100 ppm or more and 300 ppm or less. In the second aspect of the present invention, the content of the ethylene bis-oleic acid amide in the polyamide resin that forms the base material layer 1 is a total amount of ethylene bis-oleic acid amide existing in the polyamide resin and on the surface of the polyamide resin. The content of ethylene bis-oleic acid amide in the polyamide resin that forms the base material layer 1 of the battery packaging material is quantitatively determined by peeling off the base material layer 1 from the battery packaging material, dissolving the base material layer 1 in hexafluoroisopropyl alcohol, then adding dimethyl ethane to cause solvent precipitation, and separating a resin component to prepare an extracting solution of ethylene bis-oleic acid amide, and analyzing the extracting solution by GC-MS.

In the battery packaging material according to the second aspect of the present invention, it is preferable that the amount of ethylene bis-oleic acid amide existing per area of 210 mm×297 mm (A4 size) of a surface of the base material layer after the battery packaging material is left standing in a thermostatic bath at 100° C. for 24 hours is 380 μg or less. The treatment of leaving the battery packaging material standing in a thermostatic bath at 100° C. for 24 hours simulates a baking step during production of a battery cell, and when the amount of ethylene bis-oleic acid amide bled out on the surface of the base material layer 1 by the treatment is 380 μg/A4 size or less, a battery packaging material can be obtained which hardly repels an ink on a surface of the base material layer 1, and thus has further excellent printability. Specifically, the amount of the ethylene bis-oleic acid amide in the battery packaging material according to the second aspect of the present invention is a value measured by a method as described in examples below.

In the present invention (first and second aspects), the base material layer 1 can also be formed by laminating a polyamide resin and a resin different from a polyamide resin for improving pinhole resistance, and insulation quality as a package of a battery. Examples include a multilayer structure in which a polyester film and a nylon film are laminated, and a multilayer structure in which a biaxially stretched polyester and a biaxially stretched nylon are laminated. In the present invention, a polyamide resin is disposed on the outermost surface side (side opposite to the metal layer 3) when the base material layer 1 has a multilayer structure. When the base material layer 1 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-melted state, such as a co-extrusion method, a sand lamination method and a thermal lamination method. When the resin films are bonded with the use of an adhesive, the adhesive to be used may be a two-liquid curable adhesive, or may be a one-liquid curable adhesive. Further, the adhesion mechanism of the adhesive is not particularly limited, and may be any one of a chemical reaction type, a solvent volatilization type, a heat melting type, a heat pressing type, an electron beam curing type such as that of UV or EB, and so on. Examples of the component of the adhesive include polyester-based resins, polyether-based resins, polyurethane-based resins, epoxy-based resins, phenol resin-based resins, polyamide-based resins, polyolefin-based resins, polyvinyl acetate-based resins, cellulose-based resins, (meth)acryl-based resins, polyimide-based resins, amino resins, rubbers and silicone-based resins.

In the battery packaging material according to the first aspect of the present invention, the wet tension of the surface of the base material layer 1 is preferably 32 mN/m or more. Since the wet tension of the surface of the base material layer 1 is 32 mN/m or more, an ink is hardly repelled at the surface of the base material layer 1, so that printability can be further improved. Particularly, when printing is performed on a battery packaging material, the moldability of which is improved by causing a lubricant to exist at a surface of a base material layer, with an ink by pad printing, the ink may be repelled at the surface of the base material layer 1, leading to occurrence of a printing failure. Even in such a case, an ink is hardly repelled, and the battery packaging material is suitable as a battery packaging material with printed characters etc. formed on a surface of a base material layer by pad printing when the base material layer 1 is formed of a polyamide resin containing ethylene bis-stearic acid amide, and the wet tension of the surface of the base material layer 1 is 32 mN/m or more. Thus, in the present invention, at least a part of the surface of the base material layer 1 may be an ink receiving surface.

In the battery packaging material according to the second aspect of the present invention, the wet tension of the surface of the base material layer 1 is preferably 32 mN/m or more. Since the wet tension of the surface of the base material layer 1 is 32 mN/m or more, an ink is hardly repelled at the surface of the base material layer 1, so that printability can be further improved. Particularly, when printing is performed on a battery packaging material, the moldability of which is improved by causing a lubricant to exist at a surface of a base material layer, with an ink by pad printing, the ink may be repelled at the surface of the base material layer 1, leading to occurrence of a printing failure. Even in such a case, an ink is hardly repelled, and the battery packaging material is suitable as a battery packaging material with printed characters etc. formed on a surface of a base material layer by pad printing when the base material layer 1 is formed of a polyamide resin containing ethylene bis-oleic acid amide in an amount equal to or less than a predetermined amount, and the wet tension of the surface of the base material layer 1 is 32 mN/m or more.

In the battery packaging materials according to the first and second aspects of the present invention, the wet tension of the surface of the base material layer 1 is more preferably about 32 mN/m or more and 50 mN/m or less, still more preferably about 35 mN/m or more and 45 mN/m or less for improving printability while enhancing moldability.

In the first and second aspects of the present invention, the wet tension of the battery packaging material is a value obtained by performing measurement using a method conforming to JIS K6768:1999, and the specific method is as described in examples.

In the first and second aspects of the present invention, the thickness of the base material layer 1 is, for example, about 10 μm or more and 50 μm or less, preferably about 12 μm or more and 30 μm or less.

In the battery packaging material according to the first and second aspects of the present invention, printing can be suitably performed on at least a part of the surface of the base material layer 1 with an ink. In the battery packaging material in which printing is performed on the base material layer 1-side surface with an ink in the present invention, the ink (a cured product and dried product of the ink) deposited on the surface of the base material layer 1 is exposed. The deposited ink can form printed characters such as, for example, a bar code, a pattern or letters. The ink to be used for printing is not particularly limited, and a known ink can be used. For example, a photocurable ink which is cured when irradiated with an ultraviolet ray etc. can be used.

[Adhesive Agent Layer 2]

In the battery packaging material according to the present invention, the adhesive agent layer 2 is a layer provided as necessary for bonding the base material layer 1 and the metal layer 3.

The adhesive agent layer 2 is formed from an adhesive capable of bonding the base material layer 1 and the metal layer 3. The adhesive used for forming the adhesive agent layer 2 may be a two-liquid curable adhesive, or may be a one-liquid curable adhesive. Further, the adhesion mechanism of the adhesive used for forming the adhesive agent layer 2 is not particularly limited, and may be any one of a chemical reaction type, a solvent volatilization type, a heat melting type, a heat pressing type and so on.

Specific examples of the resin component of the adhesive that can be used for forming the adhesive agent layer 2 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, acid-modified polyolefins and metal-modified polyolefins; polyvinyl acetate-based resins; cellulose-based adhesives; (meth)acryl-based resins; polyimide-based resins; amino resins such as urea resins and melamine resins; rubbers such as chloroprene rubber, nitrile rubber and styrene-butadiene rubber; silicone-based resins; and ethylene fluoride-propylene copolymers. These adhesive components may be used alone, or may be used in combination of two or more thereof. The combination form of two or more adhesive components is not particularly limited, and examples of the adhesive components include mixed resins of polyamides and acid-modified polyolefins, mixed resins of polyamides and metal-modified polyolefins, mixed resins of polyamides and polyesters, mixed resins of polyesters and acid-modified polyolefins, and mixed resins of polyesters and metal-modified polyolefins. Among them, polyurethane-based two-liquid curable adhesive agents; and polyamides, polyesters or blend resins of these resins and modified polyolefins are preferred because they are excellent in spreadability, durability and a transformation inhibition action under high-humidity conditions, a thermal degradation inhibition action during heat-sealing, and so on, and effectively suppress occurrence of delamination by inhibiting a reduction in lamination strength between the base material layer 1 and the metal layer 3.

The adhesive agent layer 2 may be made multilayered with different adhesive components. When the adhesive agent layer 2 is made multilayered with different components, it is preferred that a resin excellent in adhesion with the base material layer 1 is selected as an adhesive component to be disposed on the base material layer 1 side, and an adhesive component excellent in adhesion with the metal layer 3 is selected as an adhesive component to be disposed on the metal layer 3 side for improving the lamination strength between the base material layer 1 and the metal layer 3. When the adhesive agent layer 2 is made multilayered with different adhesive components, specific examples of the preferred adhesive component to be disposed on the metal layer 3 side include acid-modified polyolefins, metal-modified polyolefins, mixed resins of polyesters and acid-modified polyolefins, and resins containing a copolymerization polyester.

The thickness of the adhesive agent layer 2 is, for example, about 2 μm or more and 50 μm or less, preferably about 3 μm or more and 25 μm or less.

[Metal Layer 3]

In the battery packaging material according to the present invention, the metal layer 3 is a layer which is intended to improve the strength of the packaging material, and also functions as a barrier layer for preventing ingress of water vapor, oxygen, light and the like into the battery. Specific examples of the metal that forms the metal layer 3 include metal foils such as those of aluminum (aluminum alloy), stainless steel and titanium. Among them, aluminum or stainless steel is suitably used. For preventing occurrence of creases and pinholes during production of the packaging material, it is preferred to use soft aluminum, for example annealed aluminum (JIS A8021P-O) or (JIS A8079P-O), for the metal layer 3 in the present invention.

The thickness of the metal layer 3 is, for example, about 10 μm or more and 200 μm or less, preferably about 20 μm or more and 100 μm or less.

Preferably, at least one surface, more preferably at least the heat-sealable resin layer 4-side surface, still more preferably both surfaces, of the metal layer 3 is/are subjected to a chemical conversion treatment for stabilization of bonding, prevention of dissolution and corrosion, and so on. Here, the chemical conversion treatment is a treatment for forming an acid resistance film on the surface of the metal layer 3. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer formed of repeating units represented by the following general formulae (1) to (4). In the aminated phenol polymer, the repeating units represented by the following general formulae (1) to (4) may be contained alone, or may be contained in combination of two or more thereof.

[Chemical Formula 1]

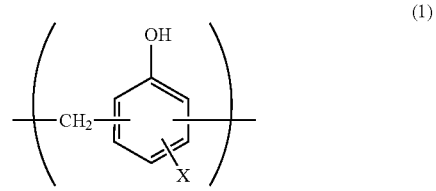

(1)

[Chemical Formula 2]

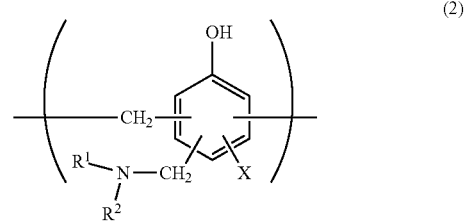

(2)

[Chemical Formula 3]

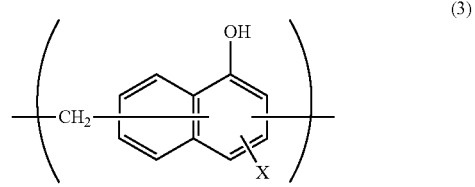

(3)

-continued

[Chemical Formula 4]

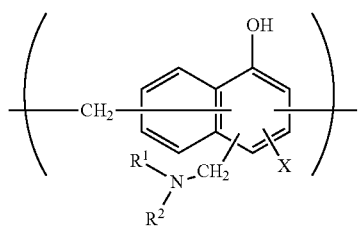

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with 1 to 4 carbon atoms, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 or more and about 1000000 or less, preferably about 1000 or more and about 20000 or less.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal layer 3. A resin layer with a cationic polymer crosslinked with a crosslinking agent may be formed on the corrosion resistance treatment layer. Here, examples of the cationic polymer include polyethyleneimine, ion polymer complexes composed of a polymer having polyethyleneimine and a carboxylic acid, primary amine-grafted acrylic resins obtained by grafting primary amine to an acryl backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

These chemical conversion treatments may be performed alone, or may be performed in combination of two or more thereof. The chemical conversion treatments may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistance film to be formed on the surface of the metal layer 3 in the chemical conversion treatment is not particularly limited, but for example when a chromate treatment is performed using a chromic acid compound, a phosphoric acid compound and the aminated phenol polymer in combination, it is desirable that the chromic acid compound be contained in an amount of about 0.5 mg or more and about 50 mg or less, preferably about 1.0 mg or more and about 40 mg or less, in terms of chromium, the phosphorus compound be contained in an amount of about 0.5 mg or more and about 50 mg or less, preferably about 1.0 mg or more and about 40 mg or less, in terms of phosphorus, and the aminated phenol polymer be contained in an amount of about 1 mg or more and about 200 mg or less, preferably about 5.0 mg or more and about 150 mg or less, per 1 $m^2$ of the surface of the metal layer 3.

The chemical conversion treatment is performed in the following manner: a solution containing a compound to be used for formation of an acid resistance film is applied to the surface of the metal layer 3 by a bar coating method, a roll coating method, a gravure coating method, an immersion method or the like, and heating is then performed so that the temperature of the metal layer 3 is about 70° C. or more and 200° C. or less. The metal layer 3 may be subjected to a degreasing treatment by an alkali immersion method, an electrolytic cleaning method, an acid cleaning method, an electrolytic acid cleaning method or the like before the metal layer 3 is subjected to the chemical conversion treatment. When a degreasing treatment is performed as described above, the chemical conversion treatment of the surface of the metal layer 3 can be further efficiently performed.

[Heat-Sealable Resin Layer 4]

In the battery packaging material according to the present invention, the heat-sealable resin layer 4 corresponds to the innermost layer, and during construction of a battery, the heat-sealable resin layer is heat-welded to itself to hermetically seal the battery element.

The resin component to be used in the heat-sealable resin layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, carboxylic acid-modified polyolefins are preferred, and carboxylic acid-modified polypropylene is further preferred.

The heat-sealable resin layer 4 may be formed from one resin component alone, or may be formed from a blend polymer obtained by combining two or more resin components. Further, the heat-sealable resin layer 4 may be formed of only one layer, but may be formed of two or more layers with the same resin component or different resin components.

In the battery packaging material according to the present invention, the heat-sealable resin layer 4 may contain a lubricant. The type of the lubricant is not particularly limited, and examples thereof include those shown as examples in the section [Base material layer 1]. When the heat-sealable resin layer 4 contains a lubricant, the content thereof may be appropriately selected, but it is preferably about 700 ppm or more and 1200 ppm or less, more preferably about 800 ppm or more and 1100 ppm or less. In the present invention, the content of the lubricant in the heat-sealable resin layer 4 is a total amount of the lubricant existing in the heat-sealable resin layer 4 and the lubricant existing on the surface of the heat-sealable resin layer 4.

The thickness of the heat-sealable resin layer 4 may be appropriately selected, and it is about 10 μm or more and 100 μm or less, preferably about 15 μm or more and 50 μm or less.

[Adhesive Layer 5]

In the battery packaging material according to the present invention, the adhesive layer 5 is a layer that is provided between the metal layer 3 and the heat-sealable resin layer 4 as necessary for strongly bonding these layers to each other.

The adhesive layer 5 is formed from an adhesive capable of bonding the metal layer 3 and the heat-sealable resin layer 4 to each other. The bonding mechanism, the kind of the adhesive agent component, and so on for the adhesive agent to be used for formation of the adhesive layer 5 are the same as those for the adhesive agent layer 2. The adhesive component to be used in the adhesive layer 5 is preferably a polyolefin-based resin, further preferably a carboxylic acid-modified polyolefin, especially preferably carboxylic acid-modified polypropylene.

The thickness of the adhesive layer 5 is, for example, 2 μm or more and 50 μm or less, preferably 15 μm or more and 30 μm or less.

3. Method for Producing Battery Packaging Material

While the method for producing the battery packaging material according to the present invention is not particularly limited as long as a laminate in which layers each having a predetermined composition are laminated is obtained, for example the following method is shown as an example.

First, a laminate including the base material layer 1, the adhesive agent layer 2 and the metal layer 3 in this order (hereinafter, the laminate may be described as a "laminate A") is formed. Specifically, the laminate A can be formed by a dry lamination method in which an adhesive to be used for formation of the adhesive agent layer 2 is applied onto the base material layer 1 or the metal layer 3, the surface of which is subjected to a chemical conversion treatment as necessary, using a coating method such as an extrusion method, a gravure coating method or a roll coating method, and dried, the metal layer 3 or the base material layer 1 is then laminated, and the adhesive agent layer 2 is cured.

Then, the heat-sealable resin layer 4 is laminated on the metal layer 3 of the laminate A. When the heat-sealable resin layer 4 is laminated directly on the metal layer 3, a resin component that forms the heat-sealable resin layer 4 may be applied onto the metal layer 3 of the laminate A by a method such as a gravure coating method or a roll coating method. When the adhesive layer 5 is provided between the metal layer 3 and the heat-sealable resin layer 4, mention is made of, for example, (1) a method in which the adhesive layer 5 and the heat-sealable resin layer 4 are co-extruded to be laminated on the metal layer 3 of the laminate A (co-extrusion lamination method); (2) a method in which the adhesive layer 5 and the heat-sealable resin layer 4 are laminated to form a laminate separately, and the laminate is laminated on the metal layer 3 of the laminate A by a thermal lamination method; (3) a method in which an adhesive for formation of the adhesive layer 5 is laminated on the metal layer 3 of the laminate A by an extrusion method or a method in which the adhesive is applied by solution coating, dried at a high temperature and baked, and the heat-sealable resin layer 4 formed in a sheet shape beforehand is laminated on the adhesive layer 5 by a thermal lamination method; and (4) a method in which the melted adhesive layer 5 is poured between the metal layer 3 of the laminate A and the heat-sealable resin layer 4 formed in a sheet shape beforehand, and simultaneously the laminate A and the heat-sealable resin layer 4 are bonded together with the adhesive layer 5 interposed therebetween (sandwich lamination). The laminate may be further subjected to a heating treatment such as that of heat roll contact type, hot air type or near- or far-infrared ray type, for enhancing the adhesion of the adhesive agent layer 2 and the adhesive layer 5 provided as necessary. As conditions for such a heating treatment, for example, the temperature is 150° C. or more and 250° C. or less, and the time is 1 minute or more and 5 minutes or less.

In the battery packaging material according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

When a surface of the battery packaging material is printed with an ink in the first aspect of the present invention, the printing method is not particularly limited, but when printing is performed on the battery packaging material after molding, pad printing is preferred. In the battery packaging material obtained by the production method according to the present invention, the base material layer is formed of a polyamide resin containing ethylene bis-stearic acid amide, so that an ink is hardly repelled, and thus printing can be suitably performed with an ink even by pad printing. Therefore, for example, printed characters such as a bar code, a pattern and letters can be suitably formed on at least a part of the surface of the base material layer 1. The ink to be used in printing is as described above.

When a surface of the battery packaging material is printed with an ink in the second aspect of the present invention, the printing method is not particularly limited, but when printing is performed on the battery packaging material after molding, pad printing is preferred. In the battery packaging material obtained by the production method according to the second aspect of the present invention, the base material layer is formed of a polyamide resin containing ethylene bis-oleic acid amide, and the content of ethylene bis-oleic acid amide in the base material layer is 400 ppm or less, so that an ink is hardly repelled, and thus printing can be suitably performed with an ink even by pad printing. Therefore, for example, printed characters such as a bar code, a pattern and letters can be suitably formed on at least a part of the surface of the base material layer 1. The ink to be used in printing is as described above.

4. Use of Battery Packaging Material

The battery packaging material according to the present invention is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to the present invention such that a flange portion (region where a heat-sealable resin layer is in contact with itself) can be formed on the periphery of the battery element while a metal terminal connected to each of the positive electrode and the negative electrode protrudes to the outside, and the heat-sealable resin layer at the flange portion is heat-sealed with itself, thereby providing a battery using a battery packaging material. When the battery element is stored using the battery packaging material according to the present invention, the battery packaging material according to the present invention is used such that the sealant portion is on the inner side (surface in contact with the battery element).

In the battery according to the present invention, the battery packaging material according to the present invention is used, printing can be suitably performed on the surface of the battery with an ink after the battery packaging material is molded, and the battery element is sealed. In the battery according to the present invention, the base material layer of the battery packaging material is formed of a polyamide resin containing ethylene bis-stearic acid amide, and therefore even by pad printing that causes the ink to be easily repelled, printing can be suitably performed on the battery packaging material with an ink, so that printed characters such as, for example, a bar code, a pattern and letters can be suitably formed on at least a part of the surface of the battery.

The battery packaging material according to the present invention may be used for either a primary battery or a secondary battery, but is preferably used for a secondary battery. The type of a secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLES

The present invention will be described in detail below by showing examples and comparative examples. It is to be noted that the present invention is not limited to the examples.

Examples 1A to 5A and Comparative Example 1A

<Production of Battery Packaging Material>

A battery packaging material including a laminate including a base material layer 1, an adhesive agent layer 2, a metal layer 3, an adhesive layer 5 and a heat-sealable resin layer 4 in this order was produced by laminating the adhesive layer 5 and the heat-sealable resin layer 4 by a co-extrusion method to a laminate including the base material layer 1, the adhesive layer 2 and the metal layer 3 in this order. Specific conditions for producing the battery packaging material are as shown below.

In each of Examples 1A to 5A and Comparative Example 1A, a biaxially stretched nylon film (thickness: 15 μm) for forming the base material layer 1, and a 35 μm-thick aluminum foil (aluminum alloy) or stainless steel foil for forming the metal layer 2 were used. The biaxially stretched nylon film for forming the base material layer 1 contains, as a water repellant, ethylene bis-stearic acid amide or ethylene bis-oleic acid amide in an amount as described in Table 1A. The aluminum foil and the stainless steel foil were subjected to a chemical conversion treatment by applying to both the surfaces of the metal layer a treatment liquid including a phenol resin, a chromium fluoride compound (trivalent) and phosphoric acid using a roll coating method in such a manner that the application amount of chromium was 10 mg/m$^2$ (dry weight), and performing baking for 20 seconds under such conditions that the film temperature was 180° C. or higher.

First, a laminate including the base material layer 1, the adhesive agent layer 2 and the metal layer 3 in this order was prepared. Specifically, the adhesive agent layer 2 composed of a two-liquid urethane adhesive agent including a polyester-based main agent and an isocyanate-based curing agent was formed in a thickness of 3 μm on one surface (corona-treated surface) of the base material layer 1, and laminated to the metal layer 3 by a dry lamination method to prepare a laminate including the base material layer 1, the adhesive agent layer 2 and the metal layer 3 in this order.

Next, as shown in Table 1A, an acid-modified polypropylene resin [unsaturated carboxylic acid-graft-modified random polypropylene graft-modified with an unsaturated carboxylic acid (acid-modified PP)] or an acid-modified polyethylene resin [unsaturated carboxylic acid graft-modified random polyethylene modified with an unsaturated carboxylic acid (acid-modified PE) for forming the adhesive layer 5, and polypropylene [random copolymer (PP)] or polyethylene (PE) for forming the heat-sealable resin layer 4 were melted, and co-extruded to a surface of the metal layer 3 of the laminate to laminate the 20 μm-thick adhesive layer 5 and the 15 μm-thick heat-sealable resin layer 4. In this way, a laminate including the base material layer 1, the adhesive agent layer 2, the metal layer 3, the adhesive layer 5 and the heat-sealable resin layer 4 in this order was obtained. The obtained laminate was temporarily cooled, then heated to 180° C., and held at this temperature for 1 minute to be heat-treated, thereby obtaining a battery packaging material.

<Measurement of Amount of Water Repellant Bled Out on Surface of Base Material Layer by Treatment Simulating Baking Step During Production of Battery Cell>

In simulation of a baking step at 100° C. during production of a battery cell, the battery packaging material obtained in each of Examples 1A to 5A and Comparative Example 1A was left standing in a thermostatic bath at 100° C. for 24 hours, the surface of the base material layer (A4 size: 210 mm×297 mm) was washed with 30 ml of methanol, and methanol after washing was volatilized/dried by blowing of nitrogen. Next, the dried and solidified component was redissolved by adding 1.5 ml of methanol thereto, and the amount of a water repellant (ethylene bis-stearic acid amide or ethylene bis-oleic acid amide) was measured by GC-MS (QP2010 manufactured by Shimadzu Corporation, ionization method: electronic ionization method (EI method), detector: quadrupole-type detector, column: Inert Cap 5MS). The results are shown in Table 1A (surface bleeding amount). The detection limit of the water repellant is 30 μg/A4 size.

<Evaluation of Wettability>

For the battery packaging material in each of Examples 1A to 5A and Comparative Example 1, which was subjected to the treatment simulating the baking step, evaluation of the dyne value of the surface of the base material layer of a battery packaging material outer packaging material was performed using a wetting reagent conforming to JIS Standard for the purpose of comparison and evaluation of printability. The test method conformed to "Plastic Film and Sheet Wet Tension Test Method in JIS K6768". A wet tension testing mixed liquid manufactured by NACALAI TESQUE, INC. was impregnated into a spherical absorbent cotton, and linearly applied over a distance of about 5 cm to the surface of the base material of the battery packaging material outer packaging material, whether or not the liquid film was broken was checked after 2 seconds, and the dyne value at which the liquid film was not broken was defined as wettability of the base material. The measurement of the wet tension was performed under an environment at a temperature of 24° C. and a relative humidity of 50%. The results are shown in Table 1A.

TABLE 1A

| | Metal layer | Adhesive layer | Heat-sealable resin layer | Amount of water repellant in base material layer | Surface bleeding amount (μg/A4 size) | Evaluation of wettability (mN/m) | Evaluation of printing characteristic |
|---|---|---|---|---|---|---|---|
| Comparative Example 1A | Aluminum alloy foil | Acid-modified PP | PP | EBO 450 ppm | 430 | 30 | 1 |
| Example 1A | Aluminum alloy foil | Acid-modified PP | PP | EBS 200 ppm | <30 | 32 | 5 |
| Example 2A | Aluminum alloy foil | Acid-modified PP | PP | EBS 400 ppm | <30 | 32 | 5 |
| Example 3A | Aluminum alloy foil | Acid-modified PP | PP | EBS 570 ppm | <30 | 32 | 4 |
| Example 4A | Stainless steel (SUS) foil | Acid-modified PP | PP | EBS 570 ppm | <30 | 32 | 4 |
| Example 5A | Aluminum alloy foil | Acid-modified PE | PE | EBS 570 ppm | <30 | 32 | 4 |

<Evaluation of Printed Characteristic>

For the battery packaging material in each of Examples 1A to 5A and Comparative Example 1A, which was subjected to the treatment simulating the baking step, the surface of the base material layer was printed with a pattern by pad printing. As a pad printer, SPACE PAD 6GX manufactured by MISHIMA CO., LTD. was used. As an ink, UV Ink PJU-A Black manufactured by Navitas Co., Ltd. was used. The ink was cured by irradiating the ink with UV light with an ultraviolet-ray wavelength of 254 nm for 30 seconds at a distance of 10 cm using Handy UV Lamp SUV-4 manufactured by AS ONE Corporation. The printed characteristic was evaluated in accordance with the following criteria. The measurement of printability was performed under an environment at a temperature of 24° C. and a relative humidity of 50%. The results are shown in Table 1A.

5: missing of printed characters is not observed.

4: the missing ratio of printed characters is 2.5% or less.

3: the missing ratio of printed characters is more than 2.5% and 5.0% or less.

2: the missing ratio of printed characters is more than 5.0% and 10% or less.

1: the missing ratio of printed characters is more than 10%.

In Table 1A, EBS denotes ethylene bis-stearic acid amide, and EBO denotes ethylene bis-oleic acid amide.

In Examples 1A to 5A where ethylene bis-stearic acid amide was used as a water repellant in nylon for forming the base material layer, surface bleeding of the water repellant was suppressed, and thus the battery packaging material had an excellent ink printing characteristic by pad printing as shown in Table 1A. An excellent printing characteristic was exhibited particularly in Examples 1A to 2A. In Comparative Example 1A where ethylene bis-oleic acid amide was used as a water repellant in nylon for forming the base material layer, the water repellant was bled out in a large amount, and thus the battery packaging material had a poor ink printing characteristic by pad printing. Each of the battery packaging materials had favorable moldability.

Examples 1B to 5B and Comparative Example 1B

<Production of Battery Packaging Material>

A battery packaging material including a laminate including a base material layer 1, an adhesive layer 2, a metal layer 3, an adhesive layer 5 and a heat-sealable resin layer 4 in this order was produced by laminating the adhesive layer 5 and the heat-sealable resin layer 4 by a co-extrusion method to a laminate including the base material layer 1, the adhesive layer 2 and the metal layer 3 in this order. Specific conditions for producing the battery packaging material are as shown below.

In each of Examples 1B to 5B and Comparative Example 1B, a biaxially stretched nylon film (thickness: 15 μm) for forming the base material layer 1, and a 35 μm-thick aluminum foil (aluminum alloy) or stainless steel foil for forming the metal layer 2 were used. The biaxially stretched nylon film for forming the base material layer 1 contains, as a water repellant, ethylene bis-oleic acid amide in an amount as described in Table 1B. The aluminum foil and the stainless steel foil were subjected to a chemical conversion treatment by applying to both the surfaces of the metal layer a treatment liquid including a phenol resin, a chromium fluoride compound (trivalent) and phosphoric acid using a roll coating method in such a manner that the application amount of chromium was 10 mg/m$^2$ (dry weight), and performing baking for 20 seconds under such conditions that the film temperature was 180° C. or higher.

First, a laminate including the base material layer 1, the adhesive layer 2 and the metal layer 3 in this order was prepared. Specifically, the adhesive layer 2 composed of a two-liquid urethane adhesive agent including a polyester-based main agent and an isocyanate-based curing agent was formed in a thickness of 3 μm on one surface (corona-treated surface) of the base material layer 1, and laminated to the metal layer 3 by a dry lamination method to prepare a laminate including the base material layer 1, the adhesive layer 2 and the metal layer 3 in this order.

Next, as shown in Table 1B, an acid-modified polypropylene resin [unsaturated carboxylic acid-graft-modified random polypropylene graft-modified with an unsaturated carboxylic acid (acid-modified PP)] or an acid-modified polyethylene resin [unsaturated carboxylic acid graft-modified random polyethylene modified with an unsaturated carboxylic acid (acid-modified PE) for forming the adhesive layer 5, and polypropylene [random copolymer (PP)] or polyethylene (PE) for forming the heat-sealable resin layer 4 were melted, and co-extruded to a surface of the metal layer 3 of the laminate to laminate the 20 μm-thick adhesive layer 5 and the 15 μm-thick heat-sealable resin layer 4. In this way, a laminate including the base material layer 1, the adhesive layer 2, the metal layer 3, the adhesive layer 5 and the heat-sealable resin layer 4 in this order was obtained. The obtained laminate was temporarily cooled, then heated to 180° C., and held at this temperature for 1 minute to be heat-treated, thereby obtaining a battery packaging material.
<Measurement of Amount of Water Repellant Bled Out on Surface of Base Material Layer by Treatment Simulating Baking Step During Production of Battery Cell>

In simulation of a baking step at 100° C. during production of a battery cell, the battery packaging material obtained in each of Examples 1B to 5B and Comparative Example 1B was left standing in a thermostatic bath at 100° C. for 24 hours, the surface of the base material layer (A4 size: 210 mm×297 mm) was washed with 30 ml of methanol, and methanol after washing was volatilized/dried by blowing of nitrogen. Next, the dried and solidified component was redissolved by adding 1.5 ml of methanol thereto, and the amount of a water repellant (ethylene bis-oleic acid amide) was measured by (GC-MS: QP2010 manufactured by Shimadzu Corporation, ionization method: electronic ionization method (EI method), detector: quadrupole-type detector, column: Inert Cap 5MS). As a result, in Examples 1B to 5B, the amount of the bled-out water repellant was reduced to 380 μg/A4 size or less. In Comparative Example 1B, the amount of the bled-out water repellant considerably exceeded 380 μg/A4 size.
<Evaluation of Printed Characteristic>

For the battery packaging material in each of Examples 1B to 5B and Comparative Example 1B, which was subjected to the treatment simulating the baking step, the surface of the base material layer was printed with a pattern by pad printing. As a pad printer, SPACE PAD 6GX manufactured by MISHIMA CO., LTD. was used. As an ink, UV Ink PJU-A Black manufactured by Navitas Co., Ltd. was used. The ink was cured by irradiating the ink with UV light with an ultraviolet-ray wavelength of 254 nm for 30 seconds at a distance of 10 cm using Handy UV Lamp SUV-4 manufactured by AS ONE Corporation. The printed characteristic was evaluated in accordance with the following criteria. The measurement of printability was performed under an environment at a temperature of 24° C. and a relative humidity of 50%. The results are shown in Table 1B.

5: missing of printed characters is not observed.
4: the missing ratio of printed characters is 2.5% or less.
3: the missing ratio of printed characters is more than 2.5% and 5.0% or less.
2: the missing ratio of printed characters is more than 5.0% and 10% or less.
1: the missing ratio of printed characters is more than 10%.
<Evaluation of Wettability>

For the battery packaging material in each of Examples 1B to 5B and Comparative Example 1B, which was subjected to the treatment simulating the baking step, evaluation of the dyne value of the surface of the base material layer of a battery packaging material outer packaging material was performed using a wetting reagent conforming to JIS Standard for the purpose of comparison and evaluation of printability. The test method conformed to "Plastic Film and Sheet Wet Tension Test Method in JIS K6768". A wet tension testing mixed liquid manufactured by NACALAI TESQUE, INC. was impregnated into a spherical absorbent cotton, and linearly applied over a distance of about 5 cm to the surface of the base material of the battery packaging material outer packaging material, whether or not the liquid film was broken was checked after 2 seconds, and the dyne value at which the liquid film was not broken was defined as wettability of the base material. The measurement of the wet tension was performed under an environment at a temperature of 24° C. and a relative humidity of 50%. The results are shown in Table 1B.

TABLE 1B

|  | Metal layer | Adhesive layer | Heat-sealable resin layer | Amount of water repellant in base material layer | Evaluation of wettability (mN/m) | Evaluation of printing characteristic |
| --- | --- | --- | --- | --- | --- | --- |
| Comparative Example 1B | Aluminum alloy foil | Acid-modified PP | PP | EBO 450 ppm | 30 | 1 |

TABLE 1B-continued

|  | Metal layer | Adhesive layer | Heat-sealable resin layer | Amount of water repellant in base material layer | Evaluation of wettability (mN/m) | Evaluation of printing characteristic |
|---|---|---|---|---|---|---|
| Example 1B | Aluminum alloy foil | Acid-modified PP | PP | EBO 50 ppm | 34 | 5 |
| Example 2B | Aluminum alloy foil | Acid-modified PP | PP | EBO 200 ppm | 33 | 5 |
| Example 3B | Aluminum alloy foil | Acid-modified PP | PP | EBO 400 ppm | 32 | 4 |
| Example 4B | Stainless steel (SUS) foil | Acid-modified PP | PP | EBO 400 ppm | 32 | 4 |
| Example 5B | Aluminum alloy foil | Acid-modified PE | PE | EBO 400 ppm | 32 | 4 |

In Table 1B, EBO denotes ethylene bis-oleic acid amide.

In Examples 1B to 5B where 400 ppm or less of ethylene bis-oleic acid amide was contained as a water repellant in nylon for forming the base material layer, the battery packaging material had an excellent ink printing characteristic by pad printing as shown in Table 1B. An excellent printing characteristic was exhibited particularly in Examples 1B to 2B. In Comparative Example 1B where ethylene bis-oleic acid amide was contained as a water repellant in an amount exceeding 400 ppm in nylon for forming the base material layer, the battery packaging material had a poor ink printing characteristic by pad printing. Each of the battery packaging materials had favorable moldability.

DESCRIPTION OF REFERENCE SIGNS

1: Base material layer
2: Adhesive agent layer
3: Metal layer
4: Heat-sealable resin layer
5: Adhesive layer

The invention claimed is:

1. A battery packaging material including a laminate including at least a base material layer, a metal layer and a heat-sealable resin layer in this order, wherein:
   the base material layer is formed of a polyamide resin containing ethylene bis-stearic acid amide, and
   the amount of ethylene bis-stearic acid amide existing per area of 210 mm×297 mm of a surface of the base material layer after the battery packaging material is left standing in a thermostatic bath at 100° C. for 24 hours is 30 μg or less.

2. The battery packaging material according to claim 1, wherein at least a part of the surface of the base material layer is an ink receiving surface.

3. The battery packaging material according to claim 1, wherein a printing layer formed of an ink is provided on at least a part of the surface of the base material layer.

4. The battery packaging material according to claim 1, wherein the surface of the base material layer has a wet tension of 32 mN/m or more.

5. The battery packaging material according to claim 1, wherein the polyamide resin is biaxially stretched nylon.

6. The battery packaging material according to claim 1, wherein an adhesive layer is provided between the base material layer and the metal layer.

7. The battery packaging material according to claim 1, wherein an adhesive layer is provided between the metal layer and the heat-sealable resin layer.

8. The battery packaging material according to claim 1, wherein the metal layer is an aluminum foil or a stainless steel foil.

9. A battery, wherein a battery element including at least a positive electrode, a negative electrode and an electrolyte is stored in a package formed of the battery packaging material according to claim 1.

10. The battery packaging material according to claim 1, wherein the content of ethylene bis-stearic acid amide in the base material layer is 50 ppm or more and 500 ppm or less.

* * * * *